(12) United States Patent
Horiuchi

(10) Patent No.: US 7,516,965 B2
(45) Date of Patent: Apr. 14, 2009

(54) VARIABLE REAR WHEEL TOE ANGLE CONTROL SYSTEM FOR A VEHICLE

(75) Inventor: Yutaka Horiuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/831,415

(22) Filed: Jul. 31, 2007

(65) Prior Publication Data

US 2008/0054577 A1 Mar. 6, 2008

(30) Foreign Application Priority Data

Aug. 29, 2006 (JP) ............................. 2006-231543

(51) Int. Cl.
*B60G 7/00* (2006.01)
(52) U.S. Cl. .............. 280/5.52; 280/5.522; 280/86.758; 701/37
(58) Field of Classification Search ................ 280/5.51, 280/5.52, 5.522, 5.521, 86.75, 86.758; 701/29, 701/36, 37
See application file for complete search history.

(56) References Cited

U.S. PATENT DOCUMENTS

| 4,726,603 | A | * | 2/1988 | Sugiyama et al. | ...... 280/86.758 |
| 4,835,714 | A | * | 5/1989 | Sano et al. | .................. 700/279 |
| 5,088,040 | A | * | 2/1992 | Matsuda et al. | ............... 701/48 |
| 5,143,400 | A | * | 9/1992 | Miller et al. | ............. 280/5.522 |
| 5,292,149 | A | * | 3/1994 | Luger | ...................... 280/5.521 |
| 5,408,411 | A | * | 4/1995 | Nakamura et al. | ........... 701/48 |
| 5,438,515 | A | * | 8/1995 | Miichi et al. | ................... 701/36 |
| 5,557,525 | A | * | 9/1996 | Miichi et al. | ................... 701/29 |
| 6,719,088 | B2 | * | 4/2004 | Nakano et al. | ............. 180/402 |
| 7,162,333 | B2 | * | 1/2007 | Koibuchi et al. | ............... 701/1 |
| 7,325,818 | B1 | * | 2/2008 | Kwon | ................... 280/86.758 |
| 2001/0011201 | A1 | * | 8/2001 | Nishizaki et al. | .............. 701/41 |
| 2002/0167218 | A1 | * | 11/2002 | Chubb | .......................... 303/5 |
| 2005/0027402 | A1 | * | 2/2005 | Koibuchi et al. | ............... 701/1 |
| 2005/0275283 | A1 | * | 12/2005 | Tsukasaki | ................... 303/140 |
| 2007/0029748 | A1 | * | 2/2007 | Baxter et al. | .......... 280/86.758 |
| 2008/0051941 | A1 | * | 2/2008 | Horiuchi et al. | ............. 700/279 |

FOREIGN PATENT DOCUMENTS

| DE | 31 39 792 A1 | 4/1983 |
| JP | 61-046702 | 3/1986 |

(Continued)

*Primary Examiner*—Toan C To
(74) *Attorney, Agent, or Firm*—Rankin, Hill & Clark LLP

(57) ABSTRACT

A variable rear wheel toe angle control system for a vehicle that can appropriately control a rear wheel toe angle without detecting a turning movement of the vehicle. Because the rear wheel toe angle can be appropriately controlled according to acceleration/deceleration of the vehicle, the turning and straight traveling performance of the vehicle can be improved. In particular, if the acceleration is computed from an output of an accelerator pedal sensor and/or an output of the brake pedal sensor, the response delay is minimized, and a favorable handling of the vehicle can be achieved. Also, the variable toe angle control may be used for favorably compensating for the change in the toe angle owing to the tendency of the vehicle to nose lift in acceleration and nose dive in deceleration caused by geometry of a rear suspension system, thereby enhancing freedom in design of the rear suspension system.

13 Claims, 3 Drawing Sheets

FOREIGN PATENT DOCUMENTS

| | | |
|---|---|---|
| JP | 61-113006 | 7/1986 |
| JP | 62-055203 | 3/1987 |
| JP | 63-192671 | 8/1988 |
| JP | 3-235708 | 10/1991 |
| JP | 4-345513 | 12/1992 |
| JP | 5-077626 | 3/1993 |
| JP | 9-030438 | 2/1997 |

* cited by examiner

VARIABLE REAR WHEEL TOE ANGLE CONTROL SYSTEM FOR A VEHICLE

TECHNICAL FIELD

The present invention relates to a variable rear wheel toe angle control system for a vehicle that can vary the toe angles of the right and left rear wheels according to an operation condition of the vehicle.

BACKGROUND OF THE INVENTION

It is known to provide a linear actuator such as a hydraulic cylinder between a vehicle body end of a lateral link or a trailing arm of a wheel suspension unit for supporting each rear wheel and the vehicle body, and to individually control the toe angles of the right and left wheels by extending or retracting the corresponding linear actuators (see Japanese patent publication No. 8-25482 and Japanese patent laid open publication No. 9-30438).

In conventional variable rear wheel toe angle control systems including those disclosed in these patent publications, it was customary to base the design on a simple rear wheel steering system. The toe angle of the rear wheels was controlled according to the behavior of the vehicle as it turns, and the control target value of the rear wheel toe angle was determined in dependence on the front wheel steering angle, lateral acceleration and/or yaw rate.

In such a system, the lateral acceleration and yaw rate are produced as a result of a change in the heading direction of the vehicle. Therefore, a response delay was inevitable because the control value of the toe angle is based on the lateral acceleration and yaw rate. Also, if the rear wheel toe angle is changed in response to a steering action of the front wheels, the stability of the vehicle in traveling along a straight path may be impaired because such a steering action may have been taken as an effort to maintain the straight course of the vehicle when the vehicle is subjected to a cross wind or when the vehicle is traveling over an irregular road surface.

BRIEF SUMMARY OF THE INVENTION

In view of such problems of the prior art, an object of the present invention is to provide a variable rear wheel toe angle control system for a vehicle that can appropriately control the rear wheel toe angle by not depending on the detection of a turning movement of the vehicle.

Another object of the present invention is to provide a variable rear wheel toe angle control system for a vehicle that can improve the behavior of the vehicle as it travels straight and makes a turn.

A further object of the present invention is to provide a variable rear wheel toe angle control method for a vehicle that can appropriately control the rear wheel toe angle by not depending on the detection of a turning movement of the vehicle.

According to the present invention such objects can be accomplished by providing a variable rear wheel toe angle control system for a vehicle, comprising: an accelerator pedal for accelerating the vehicle; a brake pedal for decelerating the vehicle; an actuator for varying a toe angle of each rear wheel; and a control unit for activating the actuator according to an operating condition of the vehicle; wherein the operating condition of the vehicle comprises a fore-and-aft acceleration of the vehicle. The present invention also provides a variable rear wheel toe angle control method for a vehicle, comprising: preparing an actuator for varying a toe angle of each rear wheel; detecting a fore-and-aft acceleration of the vehicle; and actuating the actuator in dependence on the fore-and-aft acceleration of the vehicle.

Thus, according to the present invention, because the rear wheel toe angle can be appropriately controlled according to the acceleration/deceleration of the vehicle, the turning and straight traveling performance of the vehicle can be improved. In particular, if the acceleration is computed from an output of an accelerator pedal sensor and/or an output of the brake pedal sensor, the response delay is minimized, and a favorable handling of the vehicle can be achieved.

According to a preferred embodiment of the present invention, the fore-and-aft acceleration of the vehicle is computed from both an output of the accelerator pedal sensor and an output of the acceleration sensor. Thereby, a prompt response and an accurate control action can be achieved at the same time because the accelerator pedal indicates the vehicle acceleration with a minimum time delay while the output from the acceleration sensor indicates an accurate value of the vehicle acceleration.

When the vehicle is equipped with a variable roll stiffness control system, the influence of the change in the roll stiffness on the turning property of the vehicle can be compensated by the toe angle control so that the symbiotic cooperation between the toe angle control and variable roll stiffness control allows high levels of riding comfort and drivability to be achieved.

Furthermore, according to the present invention, the variable toe angle control may be used for favorably compensating for the change in the toe angle owing to the tendency of the vehicle to nose lift in acceleration and nose dive in deceleration caused by the geometry of the rear suspension system, and this enhances the freedom in the design of the rear suspension system.

Also, the control action of the present invention not only improves the dynamic property of the vehicle but also minimized the slip angle of the tires when the vehicle is traveling along a straight path, and the resulting reduction in the rolling resistance of the tires contributes to an improved fuel economy.

BRIEF DESCRIPTION OF THE DRAWINGS

Now the present invention is described in the following with reference to the appended drawings, in which.

DETAILED DESCRIPTION OF THE PREFERRED EMBODIMENTS

Now the present invention is described in the following in more detail in terms of a concrete embodiment with reference to the appended drawings.

Figure 1:
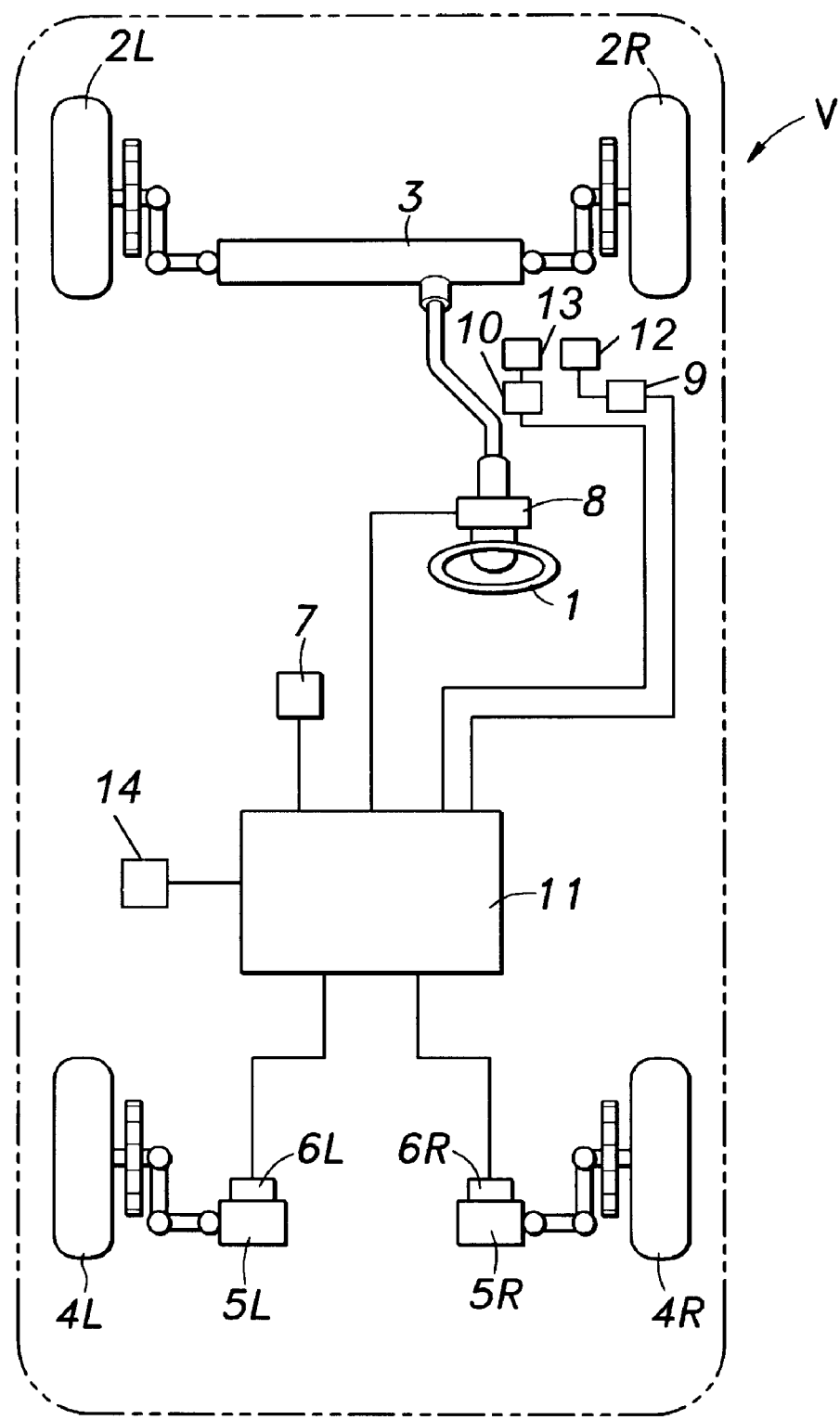
FIG. 1 is a schematic view of a vehicle to which the present invention is applied.

FIG. 1 shows an outline of a vehicle to which the present invention is applied. The vehicle V comprises a front wheel steering device 3 for directly steering a right and left front wheel 2L and 2R according to a steering angle of a steering wheel 1, a right and left actuator 5L and 5R for individually changing the toe angles of a right and left rear wheel 4L and 4R by varying the lengths of parts, such as laterals links, of rear wheel suspension units supporting the right and left rear wheels 4L and 4R, respectively, a right and left toe angle sensor 6L and 6R for individually detecting the toe angles of the right and left rear wheels 4L and 4R from the displacements of the corresponding actuators, an accelerator sensor 7 for detecting a fore-and-aft acceleration acting upon the vehicle body to use it as a reference signal for determining a target control value in the variable toe angle control, a steering angle sensor 8 for detecting the steering angle of the steering wheel 1, an accelerator pedal sensor 9 associated with an accelerator pedal 12, a brake pedal sensor 10 associated with a brake pedal 13 and a control unit 11 for controlling the displacements of the actuators 5L and 5R according to the outputs of the various sensors. The fore-and-aft acceleration can also be computed from the signals of wheel speed sensors provided on the corresponding wheels 2L, 2R, 4L and 4R. Additionally, a variable roll stiffness control system 14 is connected to the control unit 11. As mentioned hereinbefore, when the vehicle V is equipped with the variable roll stiffness control system 14, the influence of the change in roll stiffness on the turning property of the vehicle V can be compensated by the toe angle control so that the symbiotic cooperation between the toe angle control and variable roll stiffness control allows high levels of riding comfort and drivability to be achieved.

Each actuator 5L, 5R may consist of a rotary motion/linear motion converter combining an electric motor fitted with a reduction gear and a thread mechanism, a cylinder device that linearly actuates a piston rod by using hydraulic pressure or any other known linear actuator. Each toe angle sensor 6L, 6R may consist of a potentiometer or any other known displacement sensor, but preferably consists of an electromagnetic sensor or other non-contact sensor for an improved durability.

According to such a variable toe angle control system, the toe-in and toe-out of the rear wheels 4L and 4R can be freely controlled under a prescribed condition by simultaneously actuating the right and left actuators 5L and 5R in a symmetric manner. If one of the right and left actuators 5L and 5R is extended while the other is retracted, the two rear wheels 4L and 4R may be steered either in the right or left direction.

Now is considered the motion of the vehicle V when an acceleration/deceleration acts upon the vehicle V while the vehicle V is turning. The load (Wfl, Wfr, Wrl and Wrr) on each of the wheels 2R, 2L, 4R, 4L of the vehicle V while making a turn can be given as follows:

$Wfl$ (left front wheel)$=Wf/2-K\phi f/(K\phi f+K\phi r)\cdot h\cdot W\cdot \alpha y/df-h\cdot W\cdot \alpha x/(2\cdot L)$ $Wfr$ (right front wheel)$=Wf/2+K\phi f/(K\phi f+K\phi r)\cdot h\cdot W\cdot \alpha y/df-h\cdot W\cdot \alpha x/(2\cdot L)$ $Wrl$ (left rear wheel)$=Wr/2-K\phi r/(K\phi f+K\phi r)\cdot h\cdot W\cdot \alpha y/dr+h\cdot W\cdot \alpha x/(2\cdot L)$ $Wrr$ (right rear wheel)$=Wr/2+K\phi r/(K\phi f+K\phi r)\cdot h\cdot W\cdot \alpha y/dr+h\cdot W\cdot \alpha x/(2\cdot L)$ where
W: vehicle weight
h: height of gravitational center
$K\phi f$, $K\phi r$: front and rear roll stiffness
df, dr: front and rear tread
Wf, Wr: front and rear axle load
$\alpha x$: fore-and-aft acceleration
$\alpha y$: lateral acceleration
L: wheel base.

Because the lateral force is proportional to the load and lateral acceleration, the front and rear lateral forces (CFf, CFr) can be given by the following equations:

$CFf=(Wfl+Wfr)\cdot \alpha y=(Wf-h\cdot W\cdot \alpha x/L)\cdot \alpha y$ $CFr=(Wrl+Wrr)\cdot \alpha y=(Wr+h\cdot W\cdot \alpha x/L)\cdot \alpha y$ The yaw moment (ML) at this time can be computed from the lengths (Lf, Lr, Lf+Lr=L) of the arms from the gravitational center and lateral forces by using the following equations.

$$ML = -Lf \cdot CFf + Lr \cdot CFr \qquad (1)$$
$$= (-Lf \cdot Wf + Lr \cdot Wr)\cdot \alpha y + h\cdot W \cdot (Lf+Lr)\cdot \alpha x \cdot \alpha y / L$$
$$= h\cdot W \cdot \alpha x \cdot \alpha y$$

Now, the effect of the rear wheel toe angle on the turning behavior is considered in the following. If the rear wheels 4R, 4L are given with a certain toe angle ($\theta$), the lateral forces on the right and left rear wheels 4R, 4L can be given by the following equations.

$CFrl=-Krl\cdot(\beta+Lr\cdot \gamma/V+\theta)/2$ $CFrr=-Krr\cdot(\beta+Lr\cdot \gamma/V-\theta)/2$ where
$\beta$: gravitational center slip angle
$\gamma$: yaw rate
V: vehicle speed
Krl, Krr: cornering powers of right and left wheels.

By noting that the lateral forces change in dependence on the load, the static load on the rear wheels 4R, 4L is given by:

$Wrl0=Wrr0=Lf\cdot W/(2\cdot L)$ and the lateral displacement of the load is given by:

$$\Delta Wr = K\phi r/(K\phi f+K\phi r)\cdot h\cdot W\cdot \alpha y/dr$$
$$= K\cdot W \cdot \alpha y \cdot Lf/(2\cdot L).$$

Therefore, $Krl=Kr\cdot(L-K\cdot \alpha y)$ and $Krr=Kr\cdot(L+K\cdot \alpha y)$ wherein
Kr: cornering power when there is no change in the load
K: coefficient that depends on the roll stiffness ratio.

Therefore, the total lateral force acting on the rear axle (CFr) can be given by $CFr=CFrl+CFrr=-Kr\cdot(\beta+Lr\cdot \gamma/V-K\cdot \alpha y\cdot \theta)$ and the total yaw moment (M2) produced owing to the rear wheel toe angle is given by $M2=-K\cdot Kr\cdot \alpha y\cdot \theta\cdot Lr \qquad (2)$ Therefore, the to angle ($\theta$) that is required for canceling the instability yaw moment owing to the acceleration/deceleration represented by Equation (1) can be given by $\theta=h\cdot W\cdot \alpha x/(Lr\cdot Kr\cdot K) \qquad (3)$ The control rule that can be found from Equation (3) is that the rear wheel toe angle ($\theta$) that is required to cancel the instability yaw moment that is produced as the vehicle V makes a turn is given independently from the steering angle and lateral acceleration or the turning state of the vehicle V. The rear wheel toe angle obtained from Equation (3) does not produce any lateral force and there is no risk of self-steer because the right and left lateral forces balance out when the vehicle V is traveling straight, but can produce an appropriate corrective yaw moment that is required to cancel any instability moment according to the lateral acceleration produced in the vehicle V.

Figure 2:
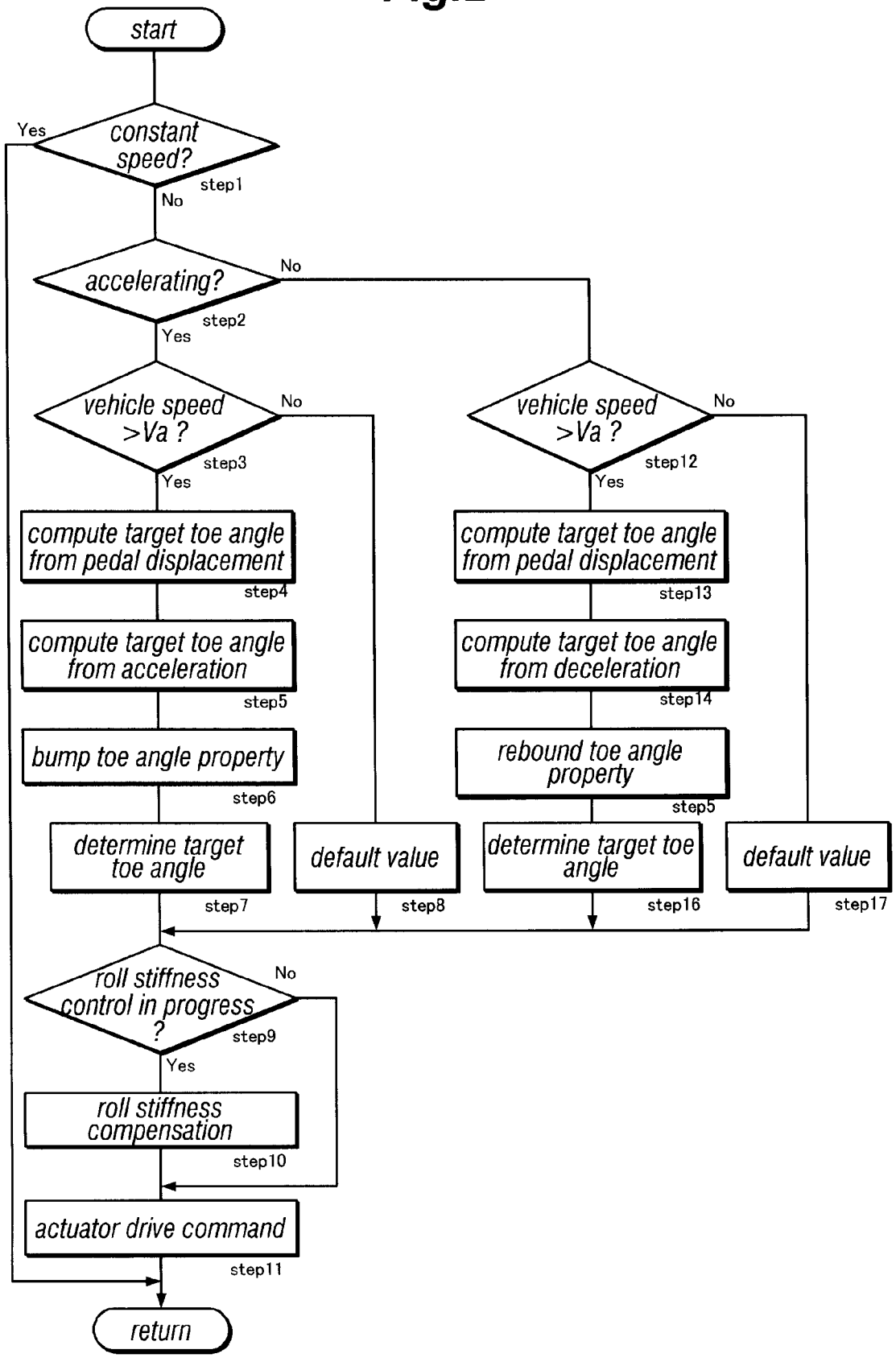
FIG. 2 is a flowchart of the control process of the system of the present invention.
Figure 3:
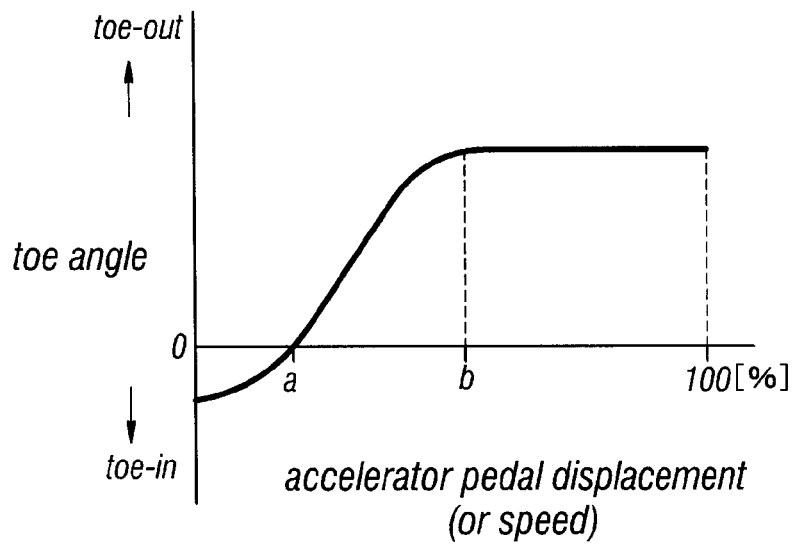
FIG. 3 is a graph showing the relationship between the toe angle and accelerator pedal displacement (speed)

FIG. 2 shows a control flow of the system of the present invention. First of all, it is determined if the vehicle V is traveling at a constant speed (step 1). If the vehicle speed is found to be changing (No), it is determined if the vehicle V is accelerating or decelerating (step 2). If the vehicle V is accelerating (Yes), it is then determined if the current vehicle speed has reached a prescribed value Va beyond which the variable toe angle control is enabled (step 3). If this value has been reached (Yes), a target toe angle is computed according to the pedal displacement of the accelerator pedal 12. An exemplary relationship between the toe angle and accelerator pedal displacement is given in FIG. 3.

A target value of the toe angle may be proportional to the acceleration/deceleration of the vehicle V, but a certain time delay is inevitable in the output of the acceleration/deceleration sensor owing to noise removing processes or the like as well as the operation of the actuator. By computing the toe angle target value according to the pedal displacement of the accelerator pedal 12 in the foregoing step, an improvement in the control response can be achieved owing to a control action similar to a feedforward control. An even further improvement in the control action similar to a feedforward control can be achieved by taking into account the time differential value of the pedal displacement (pedal speed). When such a differential value is used, point a (pedal speed at which the toe angle is zero) and point b (pedal speed at which the toe-out is maximized) in FIG. 3 may be changed by displacing these points in parallel, changing the inclination of the line connecting the two points and so on, depending on the particular condition of the vehicle V. By so doing, for instance, a large toe angle change may be caused by a small pedal displacement when the pedal speed is high so that a further improvement in the responsiveness can be achieved.

A target toe angle is then computed according to the actual acceleration that acts upon the vehicle V (step 5). The toe angle is determined in relation with the acceleration I deceleration in such a manner that a slight toe-in is selected under a constant vehicle speed condition. The toe-in is progressively increased with an increased deceleration while a greater toe-out is selected with an increased acceleration. The target toe angle value based on the accelerator pedal displacement is re-evaluated at this time. More specifically, the vehicle acceleration may vary even when the pedal displacement is the same depending on the running resistance of the vehicle V and a large pedal displacement may not necessarily produce a correspondingly high acceleration. In such a case, the target toe angle value is modified in this step.

A bump toe angle property is changed (step 6) to take into account the fact that the toe angle changes in the case of a common independent suspension system depending on the vertical displacement of the wheel or the extension and retraction of the damper. This property is due to the specific link geometry and the compliance of the bush that connects each link to the vehicle body, and is so undefined that it is highly difficult to take into account in designing an optimum toe angle property. However, according to the present invention, an optimum bump toe angle property is determined in advance according to the extent of the nose lift at the time of acceleration, and it is actively realized. Therefore, a desired bump to angle property can be achieve without depending on the link geometry, and the freedom in the design of the wheel suspension system such as the selection of a link layout that minimizes the intrusion into the passenger compartment can be enhanced.

The final target toe angle is thereby obtained (step 7). On the other hand, as long as the vehicle speed is lower than the prescribed value (No), a default toe angle target value is given (step 8).

When the final target toe angle is determined, it is determined if a variable roll stiffness control is in progress (step 9). If a variable roll stiffness control is in progress (Yes), the corresponding modification of the target toe angle (by changing the coefficient K in Equation (3) depending on the roll stiffness ratio) is effected (step 10).

The variable roll stiffness control of step 10 essentially consists of minimizing the change in the attitude of the vehicle V as it makes a turn and/or traveling over an irregular road surface, for instance, by changing the damping property of each individual shock absorber (see Japanese patent laid open publication No. 5-319057) or changing the effective torsional stiffness of the stabilizer that connects the right and left suspension arms to each other (see Japanese patent laid open publication 2000-71739). When the roll stiffness is changed, the steering property while making a turn changes, and the foregoing process compensates such changes in the steering property.

The deviation of the actual toe angle from the target toe angle and the optimum operating speed of the actuator corresponding to the current operating condition of the vehicle are determined by looking up a predetermined map, and the actuator is feedback controlled so as to achieve the target toe angle (step 11).

On the other hand, when it is determined in step 2 that the vehicle V is decelerating (No), an optimum target toe angle is computed according to the pedal displacement (speed) of the brake pedal 13 and the magnitude of the deceleration in a similar manner as in the computing step at the time of acceleration, and a target toe angle is determined after making a rebound compensation that accounts for the change in the attitude of the vehicle V owing to the nose dive at the time of deceleration (steps 12 to 17).

A slow-in, fast-out is considered to be desirable as a way of driving a vehicle on a winding road. On the other hand, when a yaw moment acts upon the vehicle, the steering property of a common vehicle is such that applying a brake causes an oversteer tendency and accelerating the vehicle causes an understeer tendency. In other words, it is possible that braking or accelerating while making a turn could impair the stability of the vehicle.

Figure 4:
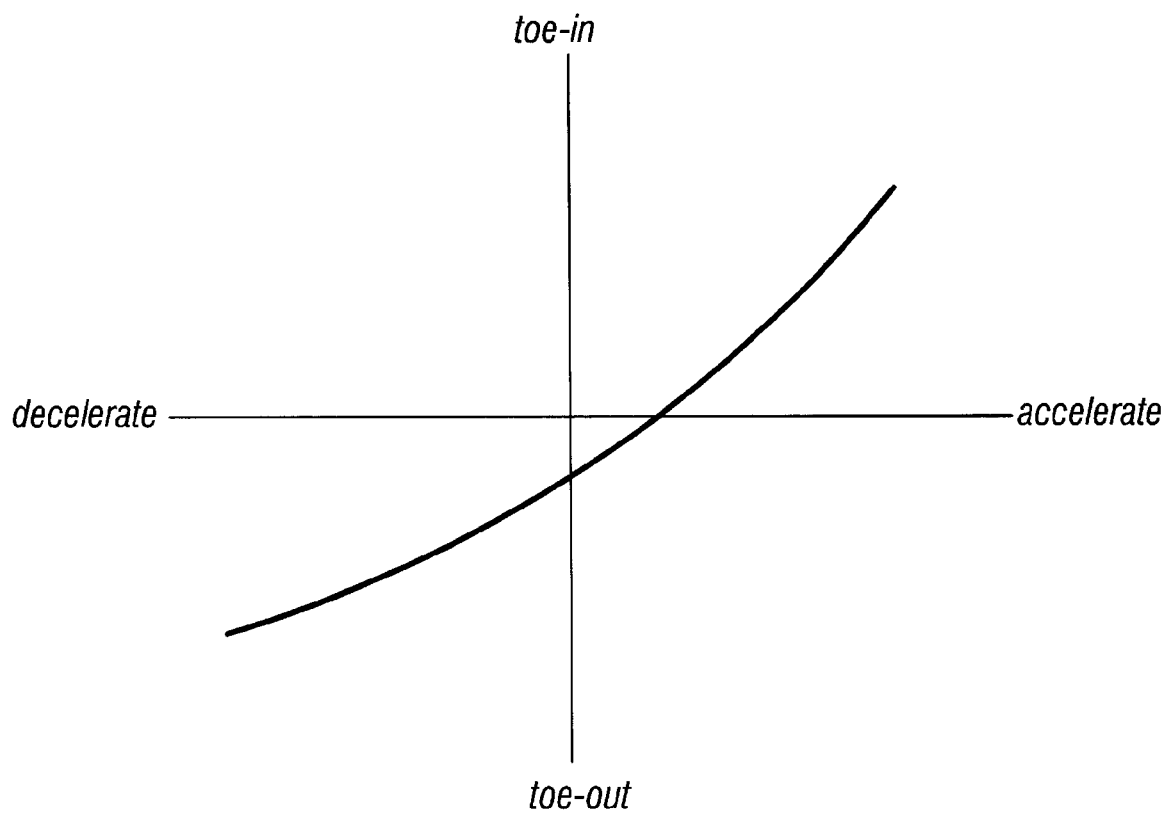
FIG. 4 is a graph showing the relationship between the toe angle and acceleration/deceleration of the vehicle.

In the toe angle control of the system of the present invention, the instability yaw moment given by Equation (1) is canceled as expressed by Equation (2), and the rear wheel toe angle changes with the fore-and-aft acceleration as given in Equation (3). In other words, as shown in FIG. 4, a slight toe-in is selected when the vehicle V is traveling at a constant speed, but the rear wheel toe angle is changed in a toe-in direction as the vehicle V starts turning while decelerating to reduce the oversteer tendency, and in a toe-out direction as the vehicle V reaches the end of the turn while accelerating to reduce the understeer tendency. Thereby, the vehicle V is able to turn in a smooth fashion. Furthermore, according to the present invention, by providing a rear toe angle given by Equation (3) even when the vehicle V is traveling straight, the yaw moment and self steer may be controlled so that the capability of the vehicle V to maintain a straight course when accelerating and decelerating can be improved.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A variable rear wheel toe angle control system for a vehicle, comprising:
an accelerator pedal for accelerating the vehicle;
a brake pedal for decelerating the vehicle;
an actuator for varying a toe angle of each rear wheel; and
a control unit for activating the actuator according to an operating condition of the vehicle;
wherein the operating condition of the vehicle comprises at least one of an accelerator pedal displacement and an accelerator pedal speed, and wherein the control unit activates the actuator to adjust the toe angle of each rear wheel to a toe-out condition when the operating condition is greater than a predetermined value.

2. The variable rear wheel toe angle control system according to claim 1, further comprising an accelerator pedal sensor for detecting the pedal displacement of the accelerator pedal, a fore-and-aft acceleration of the vehicle is computed from an output of the accelerator pedal sensor.

3. The variable rear wheel toe angle control system according to claim 1, further comprising a brake pedal sensor for detecting a pedal displacement of the brake pedal, a fore-and-aft acceleration of the vehicle is computed from an output of the brake pedal sensor.

4. The variable rear wheel toe angle control system according to claim 2, further comprising a fore-and-aft acceleration sensor for detecting the fore-and-aft acceleration of the vehicle, the fore-and-aft acceleration for the operating condition is computed from both an output of the accelerator pedal sensor and an output of the fore-and-aft acceleration sensor.

5. The variable rear wheel toe angle control system according to claim 3, further comprising a fore-and-aft acceleration sensor for detecting the fore-and-aft acceleration of the vehicle, the fore-and-aft acceleration for the operating condition is computed from both an output of the brake pedal sensor and an output of the fore-and-aft acceleration sensor.

6. The variable rear wheel toe angle control system according to claim 1, further comprising a variable roll stiffness control system, the operating condition further including an operating condition of the variable roll stiffness control system.

7. The variable rear wheel toe angle control system according to claim 1, wherein the control unit is configured to activate the actuator to adjust the toe angle of each rear wheel to a slight toe-in condition when there is no acceleration and to activate the actuator to adjust the toe angle of each rear wheel to the toe-out condition with an increasing acceleration.

8. A variable rear wheel toe angle control method for a vehicle, comprising:
preparing an actuator for varying a toe angle of each rear wheel;
detecting at least one of an accelerator pedal displacement and an accelerator pedal speed; and
actuating the actuator to adjust the toe angle of each rear wheel to a toe-out condition when the at least one of the accelerator pedal displacement and the accelerator pedal speed is greater than a predetermined value.

9. The variable rear wheel toe angle control method for a vehicle according to claim 8, further comprising:
preparing an accelerator pedal sensor for detecting the displacement of the accelerator pedal and
computing a fore-and-aft acceleration of the vehicle from an output of the accelerator pedal sensor.

10. The variable rear wheel toe angle control method for a vehicle according to claim 8, further comprising:
preparing a brake pedal sensor for detecting a displacement of a brake pedal and
computing a fore-and-aft acceleration of the vehicle from an output of the brake pedal sensor.

11. The variable rear wheel toe angle control method for a vehicle according to claim 8, further comprising:
preparing an accelerator pedal sensor for detecting the displacement of the accelerator pedal,
preparing a fore-and-aft acceleration sensor for detecting a fore-and-aft acceleration of the vehicle, and
computing the fore-and-aft acceleration of the vehicle from both an output of the accelerator pedal sensor and an output of the acceleration sensor.

12. The variable rear wheel toe angle control method for a vehicle according to claim 8, further comprising:
detecting an operating condition of a variable roll stiffness control system, and
taking into account the detected operating condition of the variable roll stiffness control system when actuating the actuator.

13. The variable rear wheel toe angle control method for a vehicle according to claim 8, wherein the actuator is actuated in such a manner that the toe angle of each rear wheel is adjusted to a slight toe-in condition when there is no acceleration and the actuator progressively adjusts the toe angle of each rear wheel in a toe-out direction with an increasing acceleration.

* * * * *